United States Patent
Shigekura et al.

(10) Patent No.: US 8,351,011 B2
(45) Date of Patent: Jan. 8, 2013

(54) LIQUID CRYSTAL DISPLAY DEVICE AND MANUFACTURING METHOD THEREOF

(75) Inventors: Yukari Shigekura, Mobara (JP); Yasuyuki Yamada, Mobara (JP); Hiroshi Miyairi, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 397 days.

(21) Appl. No.: 12/606,295

(22) Filed: Oct. 27, 2009

(65) Prior Publication Data

US 2010/0103363 A1    Apr. 29, 2010

(30) Foreign Application Priority Data

Oct. 27, 2008    (JP) .................................. 2008-275049

(51) Int. Cl.
    *G02F 1/1339*    (2006.01)
(52) U.S. Cl. ....................................................... 349/153
(58) Field of Classification Search ........... 349/153–154
    See application file for complete search history.

(56) References Cited

U.S. PATENT DOCUMENTS

| | | | | |
|---|---|---|---|---|
| 4,095,876 A | * | 6/1978 | Horsting et al. | ............... 349/154 |
| 5,184,239 A | * | 2/1993 | Sano et al. | ..................... 349/154 |

FOREIGN PATENT DOCUMENTS

JP    10-177179    6/1998

\* cited by examiner

*Primary Examiner* — James Dudek (74) *Attorney, Agent, or Firm* — Antonelli, Terry, Stout & Kraus, LLP.

(57) ABSTRACT

In an liquid crystal display device which includes: an image display part having a plurality of pixels; and a sealing member which is formed between the first substrate and the second substrate while surrounding the image display part and seals the liquid crystal therein, the sealing member includes a liquid crystal filling port which is formed by cutting away a portion of the sealing member, an side-wall edge surface of the first substrate and a side-wall edge surface of the second substrate are made coplanar with a side-wall edge surface of the sealing member along the extending direction of the sealing member on at least one side of the first substrate and the second substrate where the liquid crystal filling port is formed, and the liquid crystal filling port is formed such that a width of the liquid crystal filling port is narrowed along the liquid-crystal filling direction.

4 Claims, 9 Drawing Sheets

LIQUID CRYSTAL DISPLAY DEVICE AND MANUFACTURING METHOD THEREOF

CROSS-REFERENCE TO RELATED APPLICATION

The present application claims priority from Japanese application JP 2008-275049 filed on Oct. 27, 2008, the content of which is hereby incorporated by reference into this application.

BACKGROUND OF THE INVENTION

1. Field of the Invention

The present invention relates to a liquid crystal display device and a manufacturing method thereof, and more particularly to the improvement of a sealing-member structural portion which constitutes a portion of an envelope of the liquid crystal display device.

2. Description of the Related Art

An envelope of a liquid crystal display device is constituted of a pair of substrates which are arranged to face each other in an opposed manner with liquid crystal sandwiched therebetween and a sealing member which seals the liquid crystal in a space defined between these substrates.

An image display part is formed in the envelope, and the image display part is constituted of a plurality of pixels arranged in a matrix array, wherein each pixel includes the liquid crystal as a constitutional element thereof.

A liquid crystal filling port is formed in a portion of the sealing member. After the liquid crystal is hermetically filled into the inside of the envelope through the liquid crystal filling port, the liquid crystal filling port is sealed by applying a sealing agent to the liquid crystal filling port. Here, the sealing agent is applied in a state where the envelope is pressurized with some pressure. Thereafter, the pressure is released so that the inside of the envelope is brought into a negative pressure state thus allowing the sealing agent to intrude into a liquid crystal side.

With respect to the sealing member, for example, as disclosed in JP-A-1998-177179, there has been known a sealing member which forms extending portions which are bent toward an inlet side for allowing filling of liquid crystal on a portion thereof where the liquid crystal filling port is formed, and these extending portions are gradually separated from each other in the direction toward an inlet side.

Due to such a constitution, the liquid crystal filling port which is constituted of the sealing member is configured to form a passage whose width is gradually narrowed in the liquid-crystal filling direction due to the extending portion. Accordingly, in a state where a sealing agent is applied to the liquid crystal filling port, when the sealing agent intrudes into the passage, the sealing agent can generate a pushing force which acts on side walls of the passage thus giving rise to an advantageous effect that the hermetic property (adhesiveness) of the sealing agent with the sealing member is enhanced.

SUMMARY OF THE INVENTION

However, recently, efforts have been made to make a picture frame (a region from a profile of an image display part to a profile of a substrate) of a liquid crystal display device as small as possible.

Under such circumstances, inventors of the present invention also have made several attempts to decrease a size of a picture frame of the liquid crystal display device described in the above-mentioned JP-A-1998-177179. However, the inventors of the present invention have found that when the size of the picture frame is decreased, the liquid crystal display device cannot acquire the advantageous effect brought about by JP-A-1998-177179.

That is, in the liquid crystal display device disclosed in JP-A-1998-177179, a cut position of a substrate is disposed outside the sealing member. Accordingly, in at least a side portion of the sealing member where the liquid crystal filling port is formed, the substrate has a portion where the substrate extends (projects) outwardly from the sealing member. Due to such a constitution, the sealing member is bent toward a substrate edge portion side at a portion thereof where the liquid crystal filling port is formed thus forming the above-mentioned extending portions. However, when the substrate is formed such that the substrate does not project from the sealing member for decreasing the size of the picture frame, such structure leads to the loss of a space for forming the extending portions.

Accordingly, it is an object of the present invention to provide a liquid crystal display device which can seal a liquid crystal filling port reliably even when a picture frame is made small.

It is another object of the present invention to provide a method of manufacturing a liquid crystal display device which can enhance the plural-piece manufacturing efficiency by applying the method to the so-called plural-piece simultaneous manufacture.

In the liquid crystal display device of the present invention, side wall surfaces of side portions of a pair of substrates where a liquid crystal filling port is formed are formed on the same plane as a side wall surface of a sealing member, and a width of the liquid crystal filling port is gradually narrowed along the liquid-crystal filling direction.

Further, in the liquid crystal display device of the present invention, at the time of cutting plural-piece simultaneous manufacturing substrates, the sealing member is formed in a pattern where liquid crystal filling ports formed on one side of two neighboring liquid crystal cells face each other in an opposed manner using the sealing member in common, and the plural-piece simultaneous manufacturing substrates are cut at the same position as the common sealing member thus forming the liquid crystal filling ports of two neighboring liquid crystal cells simultaneously.

The present invention may be constituted as follows, for example.

(1) According to one aspect of the present invention, there is provided a liquid crystal display device which includes: a rectangular first substrate and a rectangular second substrate which are arranged to face each other in an opposed manner with liquid crystal sandwiched therebetween; an image display part having a plurality of pixels; and a sealing member which is formed between the first substrate and the second substrate while surrounding the image display part and seals the liquid crystal therein, wherein the sealing member includes a liquid crystal filling port which is formed by cutting away a portion of the sealing member, a side-wall edge surface of the first substrate and a side-wall edge surface of the second substrate are made coplanar with a side-wall edge surface of the sealing member along the extending direction of the sealing member on at least one side of the first substrate and the second substrate where the liquid crystal filling port is formed, and the liquid crystal filling port is formed such that a width of the liquid crystal filling port is gradually narrowed along the liquid-crystal filling direction.

(2) In the liquid crystal display device of the present invention having the above-mentioned constitution (1), respective end portions formed by cutting away the sealing member in a portion of the sealing member where the liquid crystal filling port is formed may be formed such that, as viewed in a plan view, faces of the end portions which face the liquid crystal filling port in an opposed manner have an angle inclined toward a center side of the liquid crystal filling port along the liquid-crystal filling direction.

(3) In the liquid crystal display device of the present invention having the above-mentioned constitution (1), respective end portions formed by cutting away the sealing member in a portion of the sealing member where the liquid crystal filling port is formed are formed such that, as viewed in a plan view, spotted sealing members which are formed on a more image-display-part side than a center line along the longitudinal direction of the sealing member and on a more liquid-crystal-filling-port side than the end portion are connected to the end portions.

(4) In the liquid crystal display device of the present invention having the above-mentioned constitution (1), respective end portions formed by cutting away the sealing member in a portion of the sealing member where the liquid crystal filling port is formed are formed such that faces of the end portions which face the liquid crystal filling port in an opposed manner are connected to material layers made of a material different from a material of the sealing member and, as viewed in a plan view, faces of the material layers which face the liquid crystal filling port in an opposed manner have an angle inclined toward a center side of the liquid crystal filling port along the liquid-crystal filling direction.

(5) In the liquid crystal display device of the present invention having the above-mentioned constitution (4), columnar spacers are formed between the first substrate and the second substrate in the image display part, and the material layers are made of the same material as the columnar spacers.

(6) According to another aspect of the present invention, there is provided a method of manufacturing a liquid crystal display device which separates a pair of plural-piece simultaneous manufacturing substrates which is adhered to each other by way of a sealing member into individual liquid crystal cells by cutting, wherein assuming two liquid crystal cells arranged adjacent to each other in the pair of plural-piece simultaneous manufacturing substrates as a first liquid crystal cell and a second liquid crystal cell, the first liquid crystal cell and the second liquid crystal cell respectively have a liquid crystal filling port which is formed by cutting away a portion of the sealing member, the sealing member is formed in a pattern where the sealing member is shared in common by the first liquid crystal cell and the second liquid crystal cell along one side by way of which the first liquid crystal cell and the second liquid crystal cell are arranged adjacent to each other, and the liquid crystal filling port of the first liquid crystal cell and the liquid crystal filling port of the second liquid crystal cell face each other in an opposed manner, the pair of plural-piece simultaneous manufacturing substrates is adhered to each other by way of the sealing member, and the pair of plural-piece simultaneous manufacturing substrates is cut together with the sealing member along the extending direction of the sealing member at a position where the pair of plural-piece simultaneous manufacturing substrates overlap with the sealing member which is shared in common by the first liquid crystal cell and the second liquid crystal cell along one side by way of which the first liquid crystal cell and the second liquid crystal cell are arranged adjacent to each other.

(7) In the method of manufacturing a liquid crystal display device of the present invention having the constitution (6), at the time of forming the sealing member, respective end portions which are formed by cutting away a portion of the sealing member where the liquid crystal filling port is formed are, as viewed in a plan view, formed in a pattern where a wedge-shaped recessed portion is formed on faces of the end portions which face the liquid crystal filling port in an opposed manner.

(8) In the method of manufacturing a liquid crystal display device of the present invention having the constitution (6), at the time of forming the sealing member, as viewed in a plan view, in the vicinity of respective end portions which are formed by cutting away a portion of the sealing member where the liquid crystal filling port is formed, the sealing member is formed on a liquid-crystal-filling port side and on an image-display-part side of the respective liquid crystal cells in a pattern where the sealing member has spotted sealing members, and in a state where at least the pair of the plural-piece simultaneous manufacturing substrates are adhered to each other, the spotted seal members are connected to the respective end portions which are formed by cutting away the portion of the sealing member where the liquid crystal filling port is formed.

(9) In the method of manufacturing a liquid crystal display device of the present invention having the constitution (6), before forming the sealing member, as viewed in a plan view, at a position where the liquid crystal filling port is formed, material layers are formed using a material different from a material of the sealing member in a pair of patterns where faces of the sealing member which face the liquid crystal filling port in an opposed manner have a wedge-shaped recessed portion, and in a state where at least the pair of the plural-piece simultaneous manufacturing substrates is adhered to each other, the respective end portions which are formed by cutting away the portion of the sealing member where the liquid crystal filling port is formed are connected to the material layer.

(10) In the method of manufacturing a liquid crystal display device of the present invention having the constitution (9), the material layers are formed using a material equal to a material of columnar spacers formed on an image display part.

(11) In the method of manufacturing a liquid crystal display device of the present invention having the constitution (6), the sealing member is formed by printing.

The above-mentioned constitutions are provided merely for an exemplifying purpose, and the present invention can be modified suitably without departing from the technical concept of the present invention. Further, constitutional examples of present invention other than the above-mentioned constitutions become apparent from the description of the whole specification and attached drawings.

To explain typical advantageous effects acquired by the present invention are as follows.

The liquid crystal filling port can be reliably sealed even when a size of a picture frame is made small.

The plural-piece manufacturing efficiency can be enhanced by applying the present invention to the so-called plural-piece simultaneous manufacture.

Other advantageous effects acquired by the present invention will become apparent from the description of the whole specification.

DESCRIPTION OF THE PREFERRED EMBODIMENTS

Embodiments of the present invention are explained in conjunction with drawings. Here, in the respective drawings and the respective embodiments, identical or similar constitutional parts are given same symbols and their repeated explanation is omitted.

Embodiment 1

Schematic Constitution of the Whole Liquid Crystal Display Device

Figure 1A:
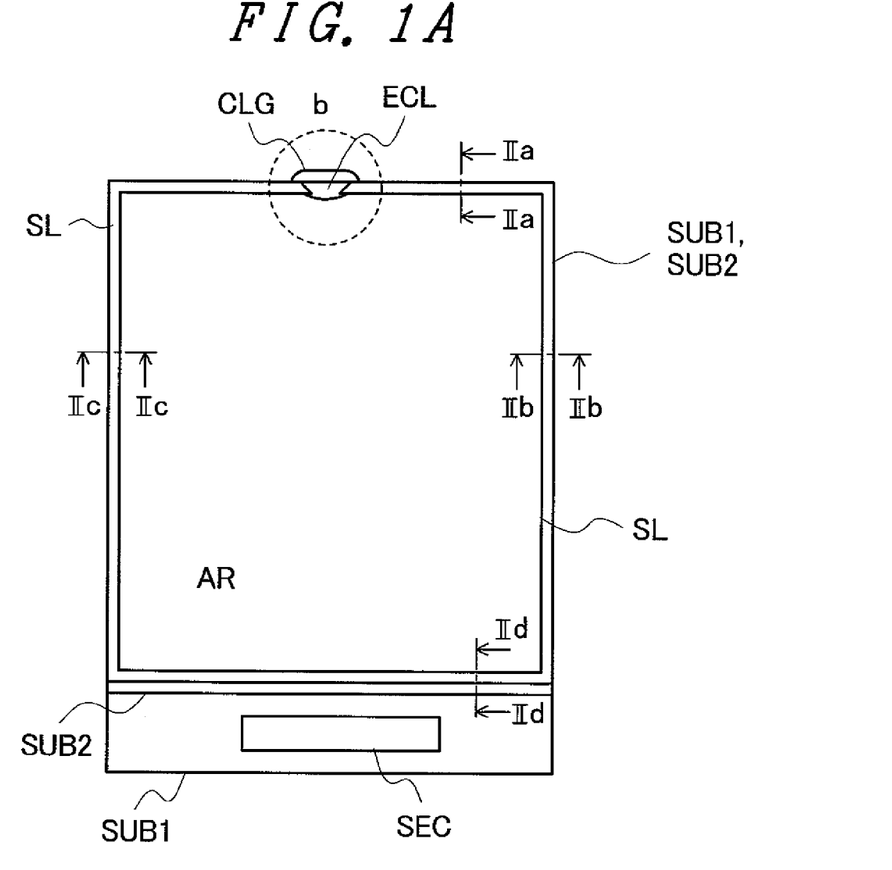
FIG. 1A is a plan view showing an embodiment 1 of a liquid crystal display device of the present invention.

FIG. 1A is a schematic plan view showing an embodiment 1 of a liquid crystal display device of the present invention.

In FIG. 1A, for example, a substrate SUB1 and a substrate SUB2 which are made of glass are arranged to face each other in an opposed manner. Both the substrate SUB1 and the substrate SUB2 have a quadrangular shape (rectangular shape). An area of the substrate SUB2 is smaller than an area of the substrate SUB1 so that a side portion of the substrate SUB1 arranged on a lower side of the drawing, for example, is exposed. A semiconductor device (chip) SEC for driving pixels is mounted on the side portion of the substrate SUB1 with the semiconductor device SEC face down on the lower side in the drawing.

Liquid crystal LC (see FIG. 2A to FIG. 2D) is sandwiched between the substrate SUB1 and the substrate SUB2. The liquid crystal LC is sealed in a gap defined between the substrate SUB1 and the substrate SUB2 using a sealing member SL. The sealing member SL is formed in an annular pattern along a periphery of the substrate SUB2, and also plays a role of fixedly adhering the substrate SUB1 and the substrate SUB2 to each other. The sealing member SL is formed on a surface of the substrate SUB2 side by coating using a printing method or by coating using a dispenser, for example. The sealing member SL is cured after the substrate SUB2 is arranged to face the substrate SUB1 in an opposed manner and is adhered to the substrate SUB1. In a region surrounded by the sealing member SL, an image display part AR is formed of a mass of a plurality of pixels each of which adopts the liquid crystal LC as one constitutional element thereof is constituted.

Here, in the sealing member SL, for example, in a portion of a side portion of the sealing member SL on a side opposite to a side where the semiconductor device SEC is arranged, a liquid crystal filling port ECL which is constituted of a cutaway portion of the sealing member SL is formed. The liquid crystal filling port ECL is sealed by a sealing agent CLG after liquid crystal is filled in a space defined between the substrate SUB1 and the substrate SUB2. The detailed constitution of the liquid crystal filling port ECL is described later.

Figure 2A:
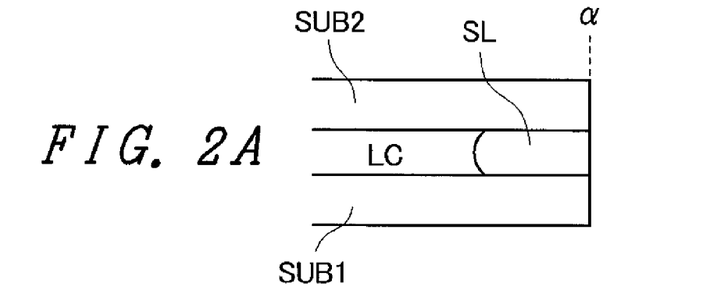
FIG. 2A is a cross-sectional view taken along a line IIa-IIa in FIG. 1A.
Figure 2B:
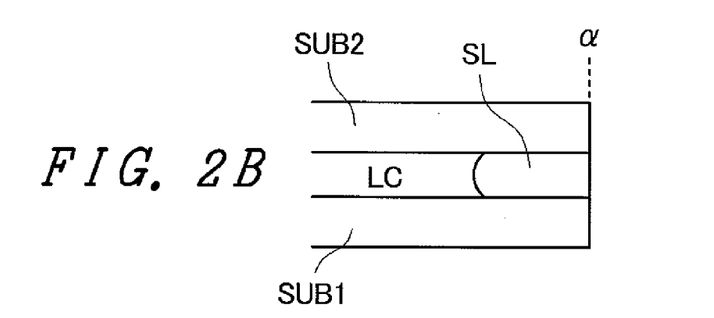
FIG. 2B is a cross-sectional view taken along a line IIb-IIb in FIG. 1A.
Figure 2C:
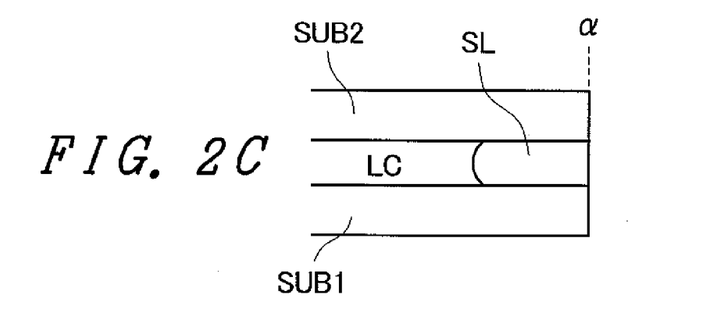
FIG. 2C is a cross-sectional view taken along a line IIc-IIc in FIG. 1A.

The substrate SUB1 and the substrate SUB2 are configured such that a side wall surface of the substrate SUB1 and a side wall surface of the substrate SUB2 are made coplanar with each other at three side portions of the substrates SUB1, SUB2 except for a side portion of the substrates SUB1, SUB2 on a side where the semiconductor device SEC is mounted. Also with respect to the sealing member SL interposed between the substrate SUB1 and the substrate SUB2, a side wall surface (outer-peripheral-side side wall surface) of the sealing member SL along the extending direction of the sealing member SL is also made coplanar with the side wall surfaces of the substrate SUB1 and the substrate SUB2. That is, FIG. 2A, FIG. 2B and FIG. 2C are respectively cross-sectional views taken along a line IIa-IIa, a line IIb-IIb and a line IIc-IIc in FIG. 1A. As can be understood from FIG. 2A, FIG. 2B and FIG. 2C, respective side wall surfaces of the substrate SUB1 and the substrate SUB2 are made coplanar with each other (in the drawing, indicated by symbol a) together with the side wall surface of the sealing member SL arranged along the extending direction of the sealing member SL. For example, in cutting the substrate SUB1 and the substrate SUB2, by cutting the substrate SUB1 and the substrate SUB2 together with the sealing member SL at a position where the respective substrates and the sealing member SL overlap with each other along the extending direction of the sealing member SL, it is possible to realize the above-mentioned constitution.

By forming the sealing member SL as close as possible to peripheries of the substrate SUB1 and the substrate SUB2 in this manner, that is, by forming the sealing member SL such that peripheries of the substrate SUB1 and the substrate SUB2 do not project from a region where the sealing member SL is formed, it is possible to narrow a picture frame (a region from a profile of an image display part AR to profiles of the substrates) of the liquid crystal display device.

Figure 2D:
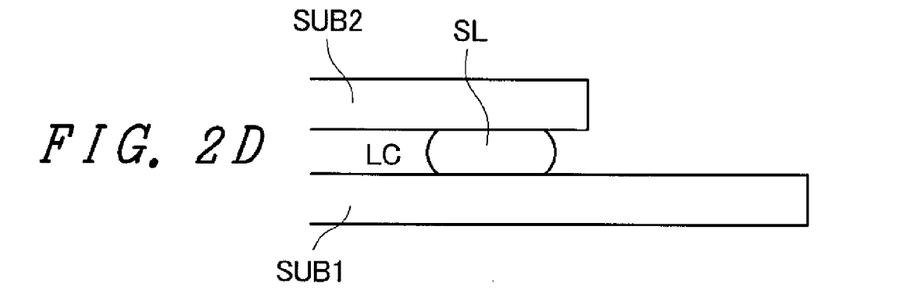
FIG. 2D is a cross-sectional view taken along a line IId-IId in FIG. 1A.

Here, FIG. 2D is a cross-sectional view taken along a line IId-IId in FIG. 1A. The sealing member SL arranged on this side portion is arranged on an image-display-part-AR side compared to the sealing member on other three side portions and hence, not to mention the substrate SUB1, the substrate SUB2 is also formed so as to slightly project from a region where the sealing member SL is formed. This side portion is a portion necessary for mounting the semiconductor device SEC and hence, the necessity of making the picture frame narrow is not large at this side portion compared to other three side portions.

Figure 1B:
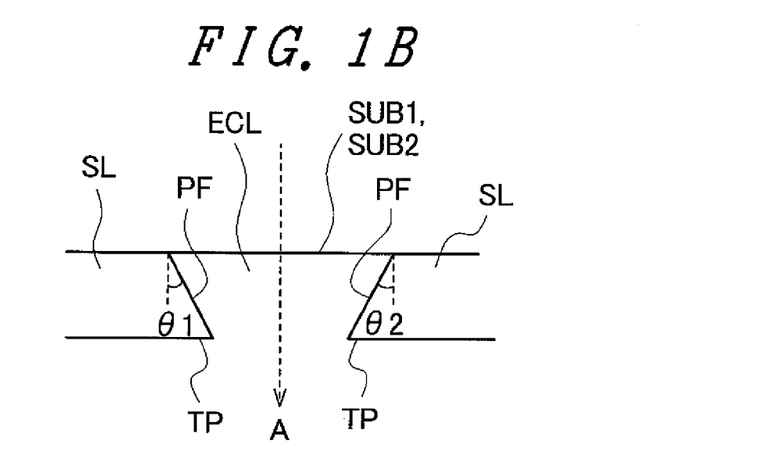
FIG. 1B is a plan view showing a filling port portion of the liquid crystal display device of the present invention.

Here, in FIG. 1 and FIG. 2, on a liquid-crystal-side surface of the substrate SUB1 and on a liquid-crystal-side surface of the substrate SUB2 respectively, a patterned insulation film, a conductive film, a semiconductor film and the like are formed in a stacked manner, and the stacked film constitutes the image display part AR. The image display part AR is constituted of a mass of a plurality of pixels which are arranged in a matrix array. However, in FIG. 1 and FIG. 2, the illustration of the stacked film is omitted. Further, also in the drawings used for the explanation made hereinafter, the illustration of the stacked film is omitted.

Constitution of Liquid Crystal Filling Port

FIG. 1B is a view showing the liquid crystal filling port ECL, and shows a portion indicated by a dotted-line frame b in FIG. 1A in an enlarged manner. Here, in FIG. 1B, the sealing agent CLG shown in FIG. 1A is omitted.

In FIG. 1B, the liquid crystal filling port ECL is constituted of the cutaway portion of the sealing member SL. The sealing member SL has a substantially uniform width in the circumferential direction thereof, and the width of the sealing member SL is not substantially changed even in the vicinity of the liquid crystal filling port ECL. Further, the sealing member SL is neither bent outwardly (because the substrate SUB1 or the substrate SUB2 not projecting outwardly from the sealing member SL) nor bent toward a display region AR side in the vicinity of the liquid crystal filling port ECL, and respective end portions TP of the sealing member SL are arranged to face each other in an opposed manner with the cutaway portion (liquid crystal filling port ECL) of the sealing member SL sandwiched therebetween. There exists no possibility that the sealing member SL which is formed in such a pattern intrudes into an image display part AR side and hence, it is possible to acquire an advantageous effect that the reduction of an area of the image display part AR can be prevented.

Further, in the respective end portions TP of the sealing member SL, faces PF which face the liquid crystal filling port ECL in an opposed manner are formed such that, as viewed in a plan view, the faces PF are respectively inclined at angles θ1, θ2 toward a center side of the liquid crystal filling port ECL along the liquid-crystal filling direction (indicated by a dotted arrow A in the drawing). The angles θ1, θ2 may be equal or different from each other. Due to such a constitution, the liquid crystal filling port ECL is formed such that a width of the liquid crystal filling port ECL is gradually narrowed along the liquid-crystal filling direction (indicated by the dotted arrow A in the drawing). The sealing member SL is formed by printing as described above and hence, the end portions TP of the sealing member SL can be formed in the above-mentioned pattern with high accuracy.

In sealing the liquid crystal filling port ECL having such a constitution using the sealing agent CLG, when the sealing agent CLG intrudes into the liquid crystal filling port ECL in the intruding direction (in the same direction indicated by the dotted arrow A in FIG. 1B) of the sealing agent CLG, the sealing agent CLG can generate a pushing force which acts on the faces PF of the respective end portions TP of the sealing member SL thus giving rise to an advantageous effect that the hermetic property (adhesiveness) of the sealing agent CLG with the sealing member SL can be enhanced.

Manufacturing Method

Figure 3:
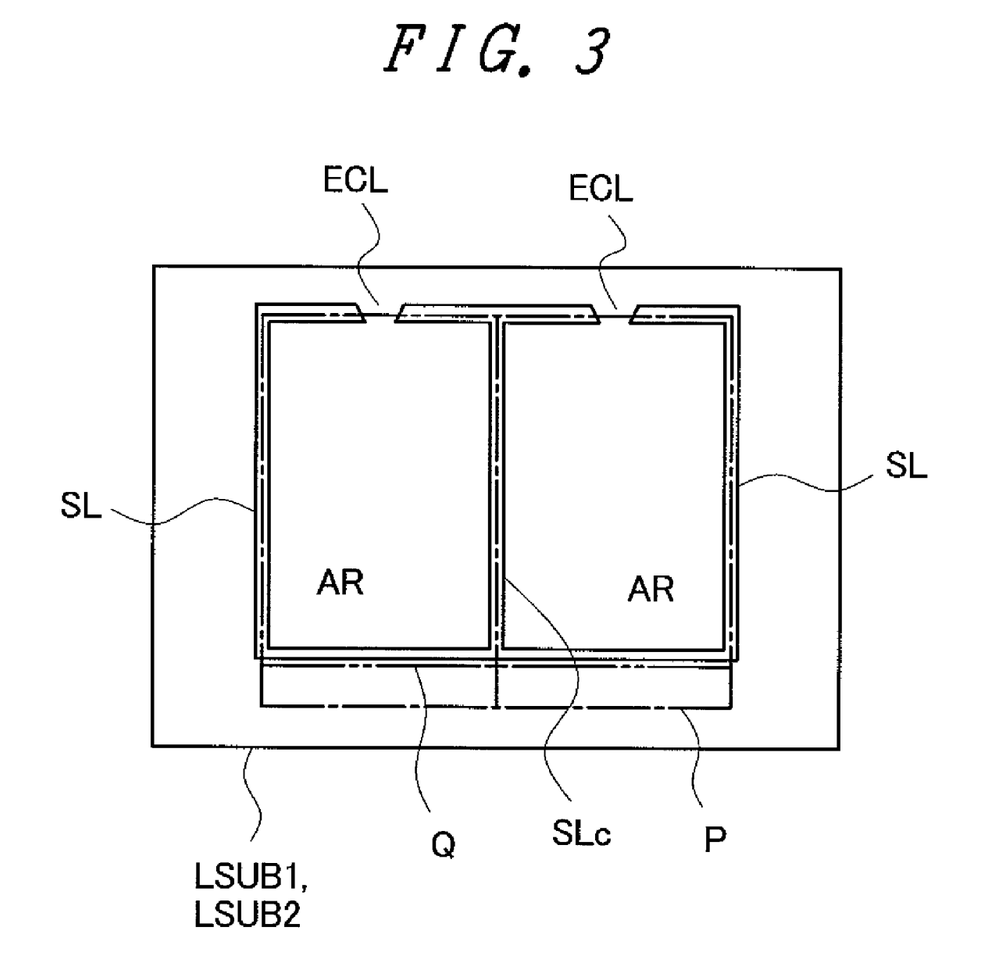
FIG. 3 is a view showing a manufacturing method of the liquid crystal display device of the present invention.

FIG. 3 is a view showing a method for forming a liquid crystal cell in manufacturing the above-mentioned liquid crystal display device. In this specification, the liquid crystal cell implies a liquid crystal display device in which an envelope is constituted of substrates and sealing member but liquid crystal is not yet filled in the envelope.

In FIG. 3, a plural-piece simultaneous manufacturing substrate LSUB1 on which the plurality of substrates SUB1 are arranged parallel to each other and a plural-piece simultaneous manufacturing substrate LSUB2 on which the plurality of substrates SUB2 are arranged parallel to each other are adhered to each other by way of a sealing member SL. In FIG. 3, with respect to the plural-piece simultaneous manufacturing substrate LSUB1 and the plural-piece simultaneous manufacturing substrate LSUB2, for the sake of convenience, a two-piece simultaneous manufacturing substrate is shown, for example. The number of liquid crystal cells which are manufactured simultaneously using the plural-piece simultaneous manufacturing substrates LSUB1, LSUB2, however, is not limited.

The sealing member SL is formed so as to define an image display part AR of each liquid crystal cell (corresponding to each region surrounded by a chained line P in the drawing). In this case, the respective liquid crystal cells are arranged parallel to each other in the lateral direction in the drawing, for example, so that the sealing members of the liquid crystal cells which are arranged adjacent to each other is formed as a common sealing member SL (indicated by symbol SLc in the drawing). As can be clearly understood from the explanation made later, the sealing member SLc is divided into the sealing member SL of one liquid crystal cell and the sealing member SL of the other liquid crystal cell by cutting the plural-piece simultaneous manufacturing substrate LSUB1 and the plural-piece simultaneous manufacturing substrate LSUB2 together with the sealing member SLc along the extending direction of the sealing member SLc at a position thereof where the substrates LSUB1, LSUB2 overlap with the sealing member SLc.

Here, the sealing member SL is formed with a width larger than or approximately twice as large as a width of a sealing member SL of a liquid crystal display device which is a final product at three respective side portions of each liquid crystal cell except for a side portion (on a lower side of the drawing) of the liquid crystal cell where the semiconductor device SEC is mounted. This is because, as can be clearly understood from the explanation made hereinafter, the plural-piece simultaneous manufacturing substrate LSUB1 and the plural-piece simultaneous manufacturing substrate LSUB2 are cut along the running direction of the sealing member SL at the substantially center of the sealing member SL. With respect to the sealing member SL formed on the side portion of each liquid crystal cell on which the semiconductor device SEC is mounted, the plural-piece simultaneous manufacturing substrate LSUB1 and the plural-piece simultaneous manufacturing substrate LSUB2 are not cut in a region where the sealing member SL is formed and hence, a width of the sealing member SL becomes equal to a width of the sealing member SL of the liquid crystal display device which is the final product.

In the sealing member SL of each liquid crystal cell, as shown in an upper side of the drawing, the liquid crystal filling port ECL which is constituted of the cutaway portion of the sealing member SL is formed. As explained in conjunction with FIG. 1B, the liquid crystal filling port ECL is formed such that, at the respective end portions TP at the portion of the sealing member SL where the liquid crystal filling port ECL is formed by cutting (at the respective end portions TP of the sealing member SL at the liquid crystal filling port ECL), the face which faces the liquid crystal filling port in an opposed manner (the face which faces the other end portion in an opposed manner) has the angle inclined toward the center side of the liquid crystal filling port along the filling direction of liquid crystal as viewed in a plan view.

Then, by cutting the plural-piece simultaneous manufacturing substrate LSUB1 and the plural-piece simultaneous manufacturing substrate LSUB2, these substrates LSUB1, LSUB2 are separated into the liquid crystal cells. In FIG. 3, the chained line P indicates portions where the plural-piece simultaneous manufacturing substrate LSUB1 is cut together with the plural-piece simultaneous manufacturing substrate LSUB2, and a double-dashed chained line Q indicates a portion where only the plural-piece simultaneous manufacturing substrate LSUB2 is cut.

A cutting line along the chained line P corresponds to an external profile line of the liquid crystal display device, and the cutting line is positioned at the center of the sealing member SL on three side portions of the liquid crystal display device along the longitudinal direction of the sealing member SL except for the sealing member SL on a side of the liquid crystal display device where the semiconductor device SEC is mounted. Further, the cutting line along the double-dashed chained line Q is positioned outside the sealing member on the side where the semiconductor device SEC is mounted parallel to the sealing member. The present invention is not limited to such an arrangement, and all 4 side portions of the substrate LSUB2 may be cut at positions where the substrate LSUB2 and the sealing member SL overlap with each other.

Liquid crystal is filled into the liquid crystal cell having such a constitution through the liquid crystal filling port ECL and, thereafter, the liquid crystal filling port ECL is sealed by the sealing agent CLG. Due to such a constitution, the liquid crystal display devices shown in FIG. 1A and FIG. 1B can be manufactured.

Embodiment 2

Figure 4A:
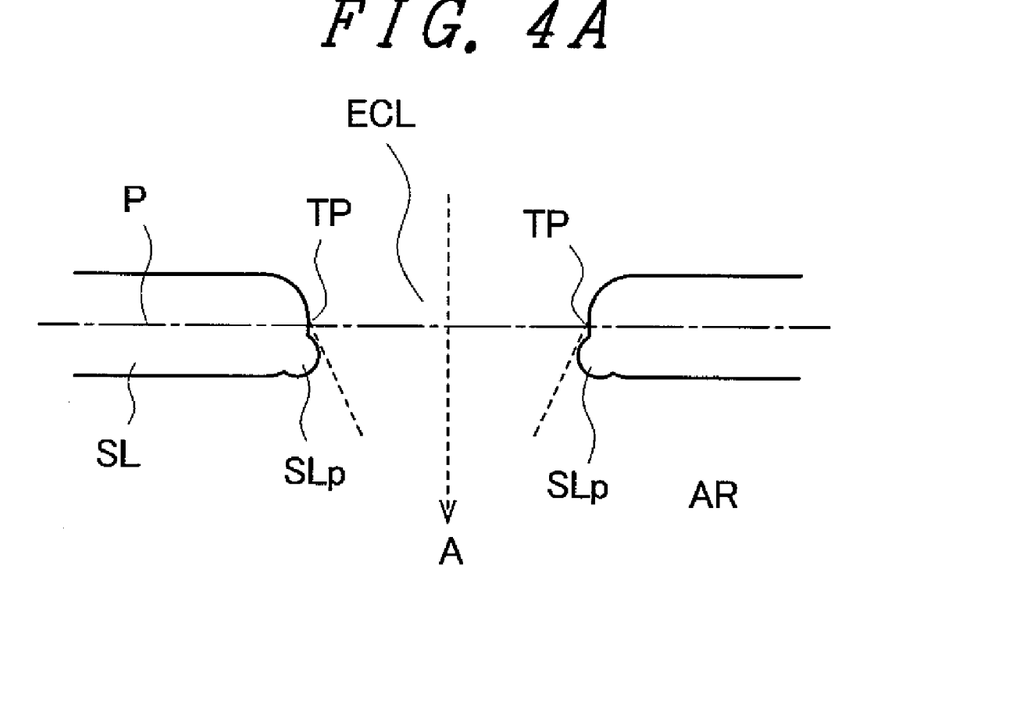
FIG. 4A is a constitutional view showing an embodiment 2 of the liquid crystal display device of the present invention.

FIG. 4A is a constitutional view showing an embodiment 2 of the liquid crystal display device of the present invention, and shows another constitution of the sealing member SL at a portion within a dotted-line frame b in FIG. 1A. Here, FIG. 4A shows a pattern of the sealing member SL after the substrate SUB1 and the substrate SUB2 are adhered to each other and a gap adjustment between the substrate SUB1 and the substrate SUB2 is made. In the state shown in FIG. 4A, the substrate SUB1 and the substrate SUB2 are not yet cut. In the drawing, a chained line P indicates a cut portion of the substrate SUB1 and the substrate SUB2. Accordingly, in FIG. 4A, the sealing member SL on a side of the drawing lower than the chained line P corresponds to the sealing member SL shown in FIG. 1B.

The constitution which makes the embodiment shown in FIG. 4A different from the embodiment shown in FIG. 1B lies in that the opposedly facing end portions TP of the sealing member SL at the liquid crystal filling port ECL have an arcuate pattern respectively, and spotted sealing members SL (indicated by symbol SLp in the drawing) which are arranged in the vicinity of the respective end portions TP are connected to the end portions TP. In this case, the spotted sealing members SLp are arranged on a more image-display-part-AR side than the center line along the longitudinal direction of the sealing member SL and on a more liquid-crystal-filling-port-ECL side than the end portions TP. Also due to the above-mentioned constitution, in the respective opposedly facing end portions TP of the sealing member SL, as viewed in a plan view, in the same manner as the constitution shown in FIG. 1B, a surface of one end portion TP which faces a surface of the other end portion TP is formed so as to have an angle as indicated by a chained line in the drawing. Accordingly, the liquid crystal filling port ECL is formed such that a width of the liquid crystal filling port ECL is gradually narrowed along the liquid-crystal filling direction thus acquiring advantageous effects substantially equal to the advantageous effects of the embodiment 1.

In the drawing, the spotted sealing member SLp has a circular shape. However, the shape of the spotted sealing member SLp is not limited to the circular shape. For example, the spotted sealing member SLp may have a rectangular or a triangular shape. This is because by forming the sealing member SLp into a shape which appears like a spot as viewed from a relatively remote position, it is possible to obtain advantageous effects substantially equal to the advantageous effects of the above-mentioned embodiments.

Figure 4B:
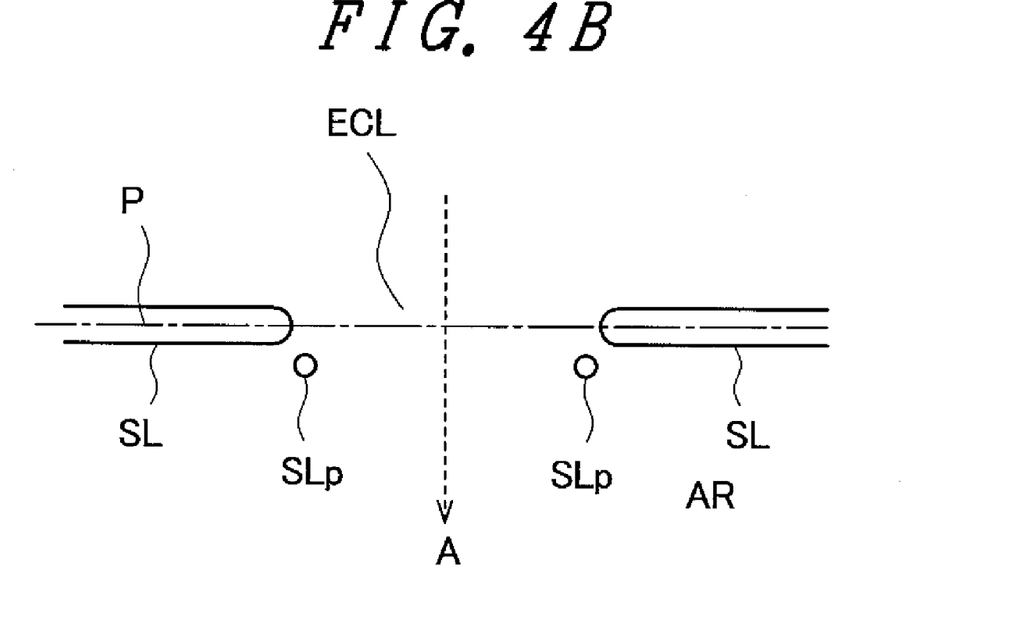
FIG. 4B is a constitutional view showing the embodiment 2 of the liquid crystal display device of the present invention.

Here, the pattern of the sealing member shown in FIG. 4A is a pattern formed at the time of adhering the substrate SUB1 and the substrate SUB2 to each other and performing the gap adjustment between the substrate SUB1 and the substrate SUB2 as described above. Accordingly, compared to the width of the sealing member at the time of printing, the width of the sealing member shown in FIG. 4A is increased due to pushing of the substrate SUB1 and the substrate SUB2 to each other. In view of the above, it is appropriate to form the sealing members at the time of printing such that the sealing member SL and the spotted sealing member SLp are arranged in a spaced-apart manner from each other as shown in FIG. 4B, for example. Then, after the substrate SUB1 and the substrate SUB2 are adhered to each other, the end portion TP of the sealing member SL and the spotted sealing member SLp are connected to each other.

However, the pattern of the sealing members is not limited to the above-mentioned pattern, and the sealing member SL may be formed in a pattern where the end portion TP of the sealing member SL and the spotted sealing member SLp are connected to each other before the substrate SUB1 and the substrate SUB2 are adhered to each other. That is, it is sufficient that the end portion TP of the sealing member SL and the spotted sealing member SLp are connected to each other in a state that at least the adhesion of the substrate SUB1 and the substrate SUB2 to each other is completed.

Embodiment 3

Figure 5A:
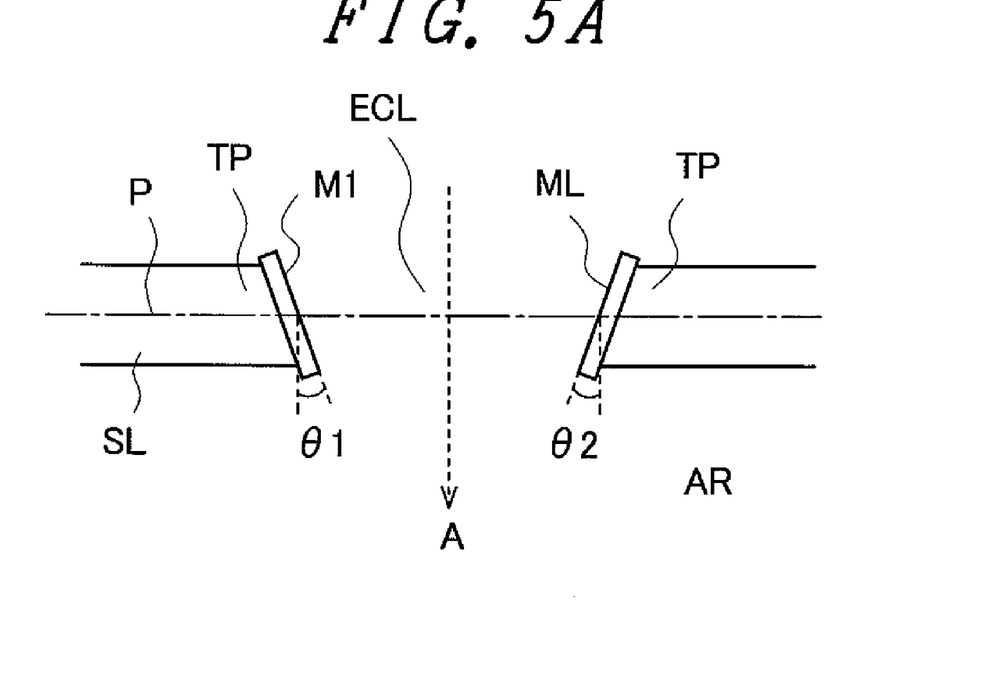
FIG. 5A is a constitutional view showing an embodiment 3 of the liquid crystal display device of the present invention.

FIG. 5A is a constitutional view showing an embodiment 3 of the liquid crystal display device of the present invention, and shows another constitution of the sealing member SL within the dotted-line frame b in FIG. 1A. FIG. 5A shows, in the same manner as the case shown in FIG. 4A, a pattern of the sealing member SL where the substrate SUB1 and the substrate SUB2 are adhered to each other and the gap adjustment between the substrate SUB1 and the substrate SUB2 is made but the substrate SUB1 and the substrate SUB2 is not yet cut from each other. In the drawing, a chained line P indicates a portion where the substrate SUB1 and the substrate SUB2 are cut.

In FIG. 5A, to respective opposedly-facing end portions TP of the sealing member SL which constitute the liquid crystal filling port ECL, a material layer ML made of a material different from a material of the sealing member SL is respectively connected. The material layers ML are formed simultaneously with the formation of columnar spacers (indicated by symbol SP in FIG. 5B) within an image display part AR described later, for example, and are formed of the same material as the columnar spacers SP. Further, liquid-crystal-filling-port-side faces of the material layers ML are respectively formed with inclination toward the center of the liquid crystal filling port ECL along the liquid-crystal filling direction (in the direction indicated by an arrow A in the drawing) at angles $\theta1, \theta2$. Angles $\theta1, \theta2$ may be equal or different from each other. Also due to the above-mentioned constitution, a width of the liquid crystal filling port ECL is gradually narrowed along the liquid-crystal filling direction and hence, this embodiment can also acquire advantageous effects substantially equal to the advantageous effects of the embodiment 1. It is sufficient that the end portion TP of the sealing member SL and the material layer ML are connected to each other at least in a state that the substrate SUB1 and the substrate SUB2 are already adhered to each other. Accordingly, before the substrate SUB1 and the substrate SUB2 are adhered to each other, the end portion TP of the sealing member SL and the material layer ML may be separated from each other or brought into contact with each other.

Figure 5B:
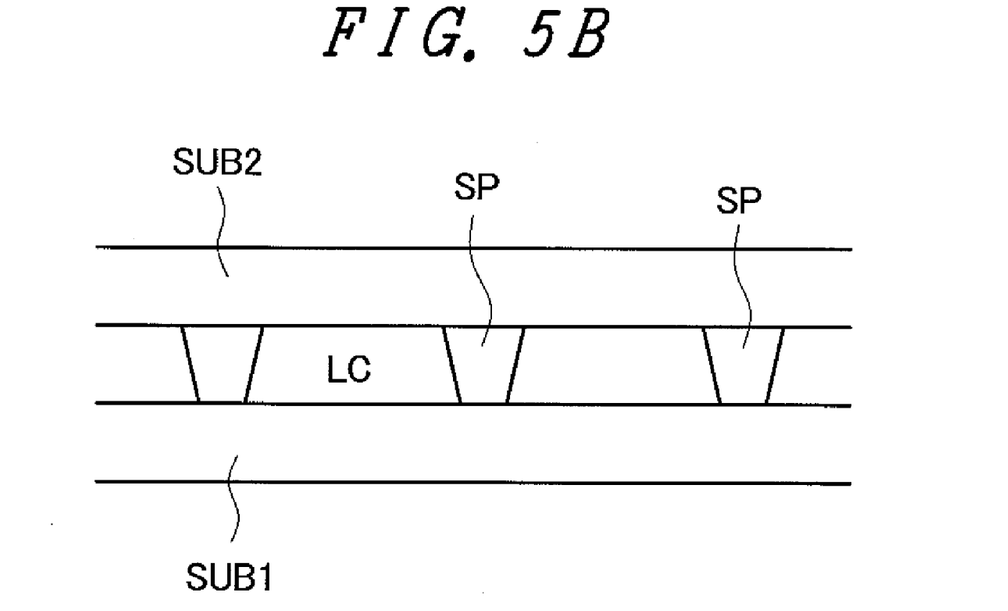
FIG. 5B is a constitutional view showing the embodiment 3 of the liquid crystal display device of the present invention.

Here, FIG. 5B is a view showing a cross section of the image display part AR of the liquid crystal display device. In FIG. 5B, the columnar spacers SP are arranged between the substrate SUB1 and the substrate SUB2 in a state that the columnar spacers SP have base portions thereof fixed to the substrate SUB2 and have top portions thereof brought into contact with the substrate SUB1. The columnar spacers SP are formed by selectively etching, for example, a resin layer formed on the substrate SUB2 side using a photolithography technique. Further, by forming a plurality of columnar spacers SP in the image display part AR in a dispersed manner, the gap adjustment between the substrate SUB1 and the substrate SUB2 can be reliably performed. The material layers ML shown in FIG. 5A are formed simultaneously with the formation of the columnar spacers SP, for example, thus preventing the increase of the number of manufacturing steps.

The liquid crystal filling port ECL described in this embodiment can be constituted of the sealing member SL with a part cutaway and the material layers ML which are formed by selective etching using a photolithography technique. Particularly, this embodiment can acquire an advantageous effect that the liquid crystal filling port ECL can be formed into a desired shape due to the provision of the material layers ML.

Embodiment 4

Figure 6:
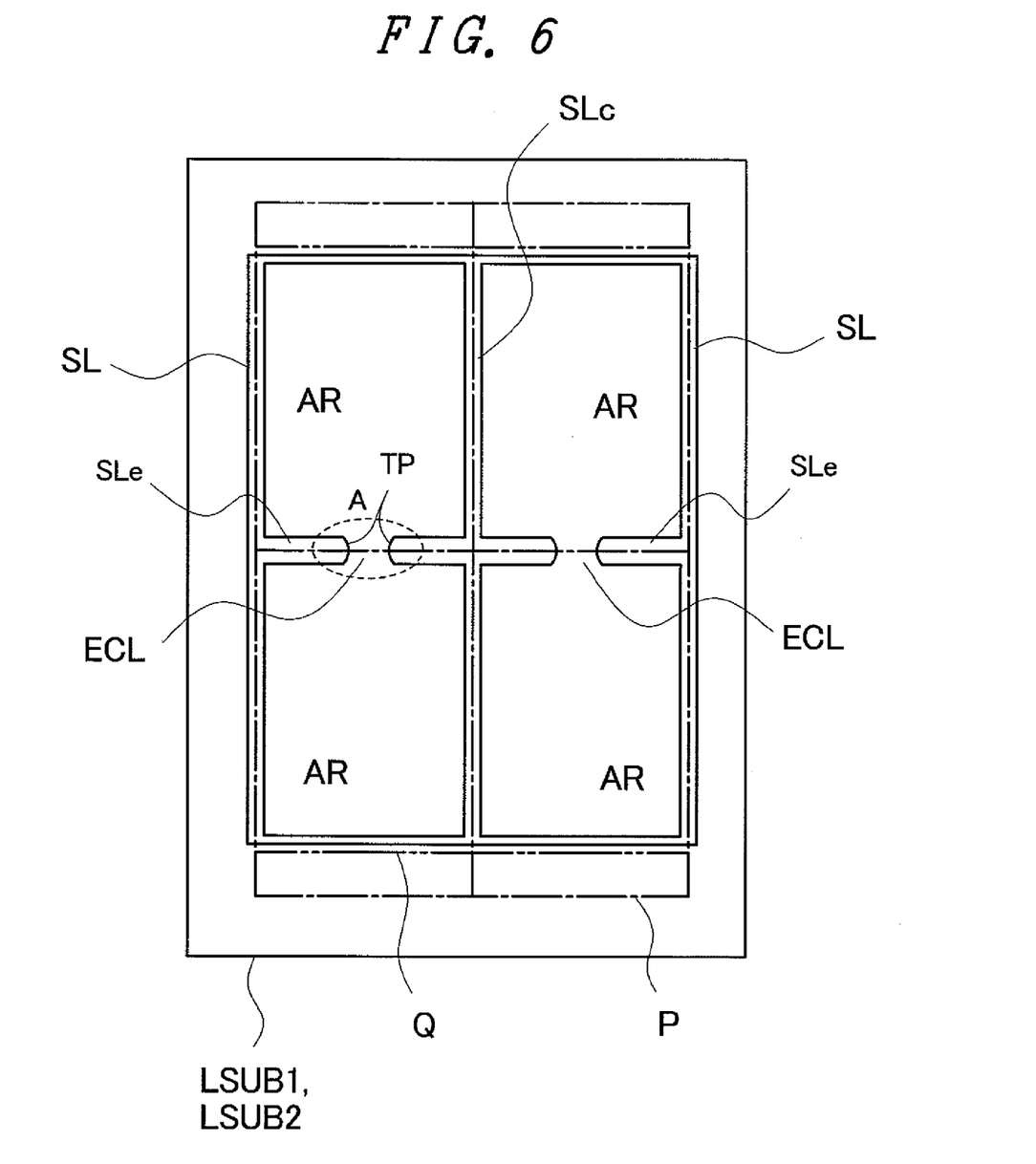
FIG. 6 is a constitutional view showing an embodiment 4 of the liquid crystal display device of the present invention.

FIG. 6 is a constitutional view showing an embodiment 4 of the present invention, and shows a manufacturing method of the liquid crystal display device. FIG. 6 corresponds to FIG. 3 and shows a method for forming liquid crystal cells.

The constitution which makes the embodiment shown in FIG. 6 different from the embodiment shown in FIG. 3 lies in that liquid crystal cells which are arranged parallel to each other in the vertical direction are formed in addition to the liquid crystal cells which are arranged parallel to each other in the lateral direction, the respective liquid crystal cells which are arranged parallel to each other in the vertical direction share the sealing member SL (indicated by symbol SLe in the drawing) in common, and liquid crystal filling ports ECL are formed by forming cutaway portions in portions of the sealing member SLe. That is, the respective liquid crystal cells are arranged such that a liquid-crystal-filling-port-ECL side of one liquid crystal cell and a liquid-crystal-filling-port ECL of another liquid crystal cell arranged adjacent to one liquid crystal cell face each other in an opposed manner, and two liquid crystal cells arranged adjacent to each other share the liquid crystal filling port ECL and the sealing member SLe in which the liquid crystal filling port ECL is formed in common. Further, by cutting the substrate SUM and the substrate SUB2 at the same position as the common sealing member SLe, the liquid crystal filling ports ECL of two liquid crystal cells can be simultaneously formed.

Cutting positions where the plural-piece simultaneous manufacturing substrate LSUB1 and the plural-piece simultaneous manufacturing substrate LSUB2 are cut are indicated by a chained line P and a double-dashed chained line Q corresponding to the constitution shown in FIG. 3. By cutting the plural-piece simultaneous manufacturing substrate LSUB1 and the plural-piece simultaneous manufacturing substrate LSUB2, the sealing member SLe is divided into the sealing member SL and the liquid crystal filling ports ECL of the liquid crystal cells on an upper side of the drawing, and the sealing members SL and the liquid crystal filling ports ECL of the liquid crystal cells on a lower side of the drawing. That is, the pair of the plural-piece-simultaneous-manufacturing substrates LSUB1, LSUB2 are cut together with the sealing member SLe along the extending direction of the sealing member SLe at a position where the pair of the plural-piece simultaneous manufacturing substrates LSUB1, LSUB2 overlaps with the sealing member SLe which is formed in common.

Due to such a constitution, the respective liquid crystal cells arranged adjacent to each other can be arranged with no gaps therebetween even on a side where the liquid crystal filling ports ECL are formed, for example, and hence, the efficiency of the plural-piece-simultaneous manufacturing method can be largely enhanced. Such an advantageous effect does not depend on the shape of the liquid crystal filling port ECL explained in conjunction with the embodiments 1 to 3 and hence, in the embodiment 4, respective end portions TP formed by cutting away a portion of the sealing member SLe where the liquid crystal filling port ECL is formed may have faces thereof which face the liquid crystal filling port ECL formed into an arcuate shape as shown in FIG. 6. It is needless to say that the liquid crystal filling port ECL of this embodiment 4 may have the shapes explained in conjunction with the embodiments 1 to 3.

Here, FIG. 6 shows a case where two liquid crystal cells are arranged in the vertical direction in the drawing and two liquid crystal cells are arranged in the lateral direction in the drawing. However, three or more liquid crystal cells may be arranged in the vertical direction in the drawing or three or more liquid crystal cells may be arranged in the lateral direction in the drawing.

Embodiment 5

Figure 7:
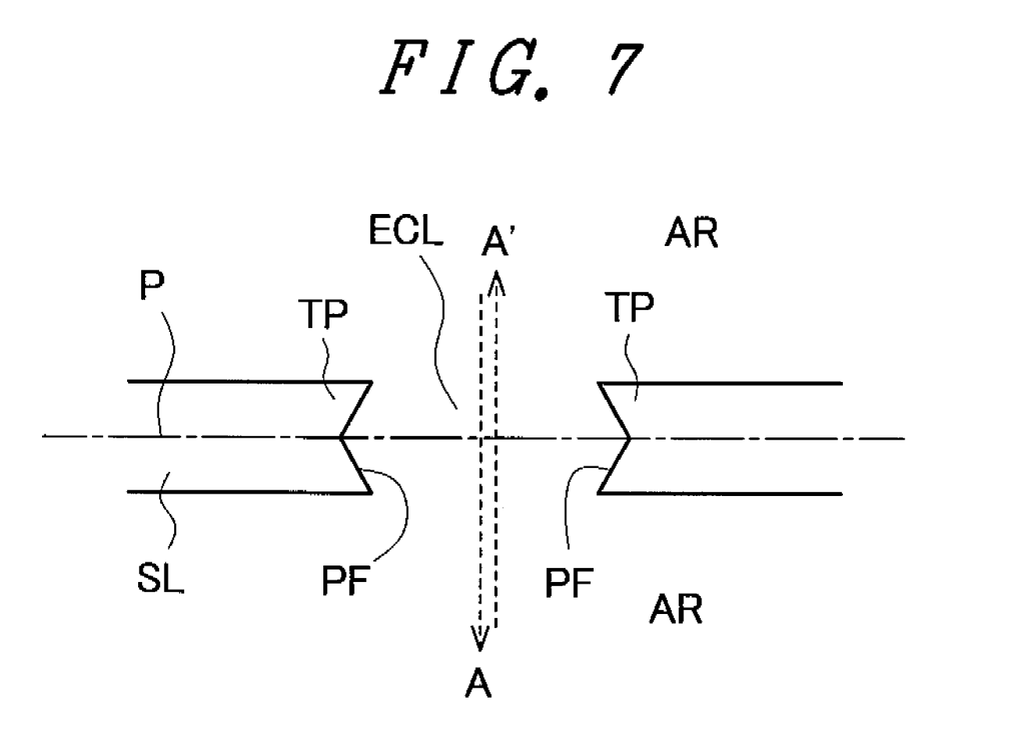
FIG. 7 is a constitutional view showing an embodiment 5 of the liquid crystal display device of the present invention.

FIG. 7 is a constitutional view showing an embodiment 5 of the manufacturing method of the liquid crystal display device of the present invention. The embodiment 5 corresponds to the combination of the embodiment 4 and the embodiment 1. FIG. 7 shows another constitution of the respective end portions TP formed by cutting away a portion of the sealing member SL where the liquid crystal filling port ECL is formed in adopting the manufacturing method explained in conjunction with the embodiment 4. FIG. 7 is an enlarged view of a portion within an elliptical frame A indicated by a dotted line in FIG. 6, for example.

In FIG. 7, the respective end portions TP which are formed by cutting away a portion of the sealing member SL where the liquid crystal filling port ECL is constituted are formed in a pattern where a wedge-shaped recessed portion is formed on faces PF of the end portions TP which face the liquid crystal filling port ECL in an opposed manner. Further, a bottom portion of the recessed portion which is formed on the end portion TP of the sealing member SL is substantially aligned with a center line (for example, corresponding to a chained line P in the drawing) along the longitudinal direction of the sealing member SL. Due to such a constitution, when the pair of plural-piece simultaneous manufacturing substrates LSUB1, LSUB2 is cut along the chained line P in the drawing, a shape of the sealing members SL (the liquid crystal filling port ECL) of the respective liquid crystal cells which are arranged adjacent to each other with the chained line P sandwiched therebetween as a boundary can be formed into a shape shown in FIG. 1B. Accordingly, this embodiment can acquire an advantageous effect that the liquid crystal filling port ECL can be reliably sealed by the sealing agent CLG. Here, in the drawing, an arrow A indicates the direction that liquid crystal is filled into the lower liquid crystal cell, and an arrow A' indicates the direction that liquid crystal is filled in the upper liquid crystal cell. The same goes for embodiments explained hereinafter and hence, the explanation of the filling direction is omitted in such embodiments.

Embodiment 6

Figure 8A:
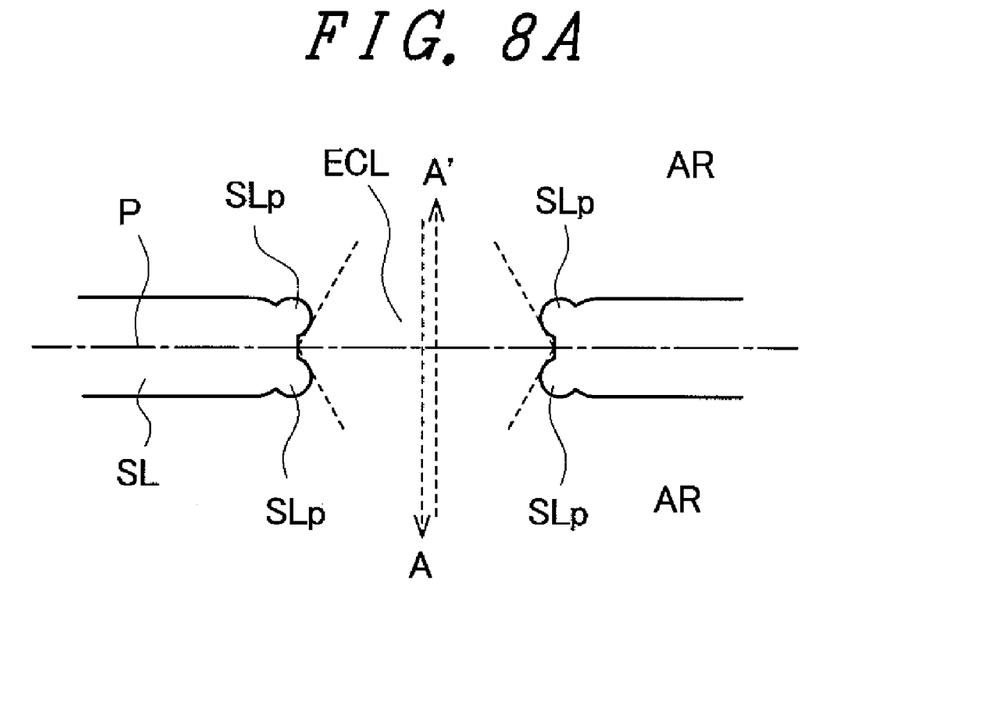
FIG. 8A is a constitutional view showing an embodiment 6 of the liquid crystal display device of the present invention.

FIG. 8A is a constitutional view showing an embodiment 6 of the manufacturing method of the liquid crystal display device of the present invention. The embodiment 6 corresponds to the combination of the embodiment 4 and the embodiment 2. FIG. 8A is a view showing another constitution of the respective end portions TP formed by cutting away a portion of the sealing member SL where the liquid crystal filling port ECL is formed in adopting the manufacturing method explained in conjunction with the embodiment 4, and FIG. 8A corresponds to FIG. 7.

In FIG. 8A, the end portions TP formed by cutting away the portion of the sealing member SL where the liquid crystal filling port ECL is constituted are formed such that, as viewed in a plan view, faces of the end portions TP which face the liquid crystal filling ports ECL in an opposed manner have an arcuate shape by patterning, for example, and two spotted sealing members (indicated by a symbol SLp in the drawing) are arranged in the vicinity of each end portion TP and are connected to the end portion TP. Two spotted sealing members SLp are arranged on a liquid-crystal-filling-port-ECL side with respect to the end portion TP. Out of two spotted sealing members SLp, one sealing member SLp is arranged on one liquid-crystal-cell side and another sealing member SLp is arranged on the other liquid-crystal-cell side with a chained line P sandwiched therebetween as a boundary.

Due to such a constitution, when the pair of plural-piece simultaneous manufacturing substrates LSUB1, LSUB2 is cut along the chained line P in the drawing, a shape of the sealing members SL (a shape of liquid crystal filling ports ECL) of the respective liquid crystal cells which are arranged adjacent to each other with the chained line P sandwiched therebetween as the boundary can be formed into a shape shown in FIG. 4A. Accordingly, this embodiment can acquire an advantageous effect that the liquid crystal filling port ECL can be reliably sealed by the sealing agent CLG.

Figure 8B:
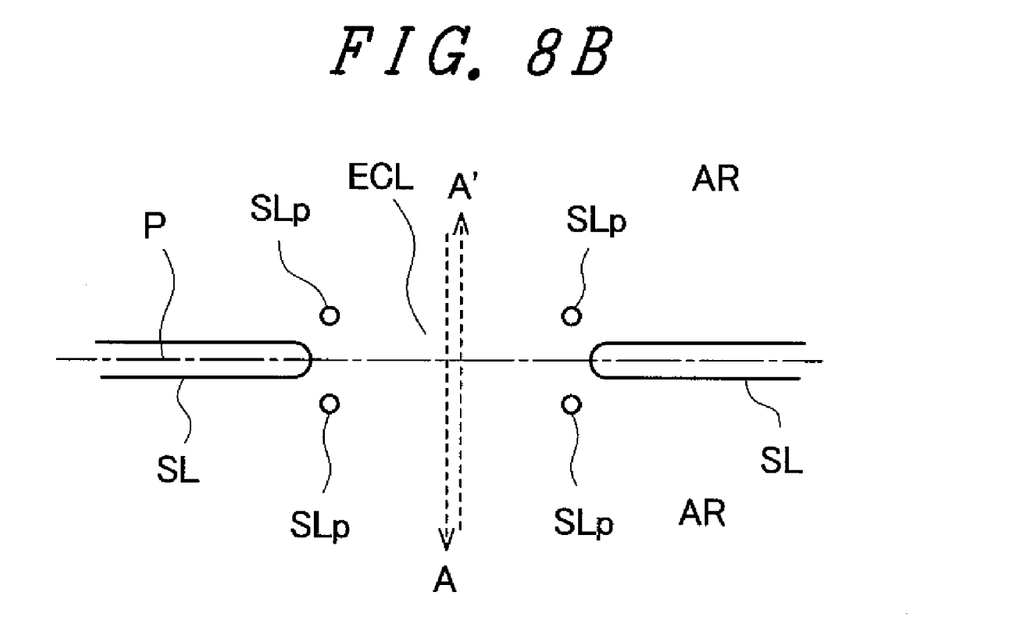
FIG. 8B is a constitutional view showing the embodiment 6 of the liquid crystal display device of the present invention.

Here, the pattern of the sealing member SL shown in FIG. 8A is a pattern formed at the time of adhering the substrate SUB1 and the substrate SUB2 to each other and performing the gap adjustment between the substrate SUB1 and the substrate SUB2. Accordingly, compared to the width of the sealing member at the time of printing, the width of the sealing member shown in FIG. 8A is increased due to pushing of the substrate SUB1 and the substrate SUB2 to each other. In view of the above, it is appropriate to form the sealing members SL at the time of printing such that the sealing member SL and the spotted sealing member SLp are arranged in a spaced-apart manner from each other as shown in FIG. 8B, for example. Then, after the substrate SUB1 and the substrate SUB2 are adhered to each other, the end portion TP of the sealing member SL and the spotted sealing member SLp are connected to each other.

However, the pattern of the sealing members is not limited to the above-mentioned pattern, and the sealing member SL may be formed in a pattern where the end portion TP of the sealing member SL and the spotted sealing member SLp are connected to each other before the substrate SUB1 and the substrate SUB2 are adhered to each other. That is, it is sufficient that the end portion TP of the sealing member SL and the spotted sealing member SLp are connected to each other at least in a state that the adhesion of the substrate SUB1 and the substrate SUB2 to each other is already completed.

Embodiment 7

Figure 9:
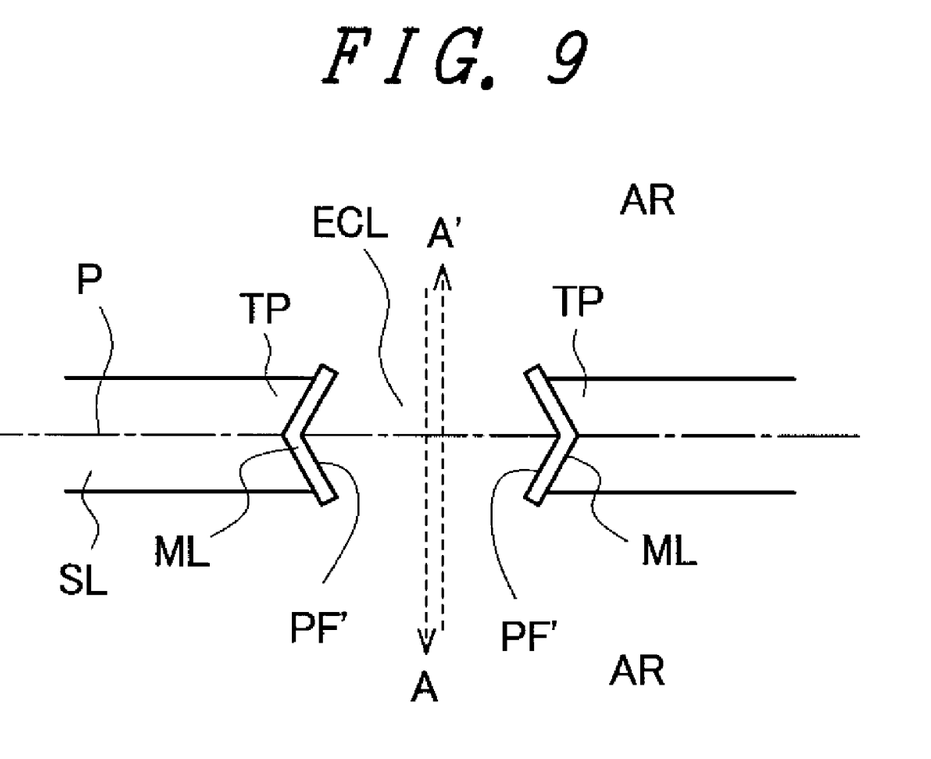
FIG. 9 is a constitutional view showing an embodiment 7 of the liquid crystal display device of the present invention.

FIG. 9 is a constitutional view showing an embodiment 7 of the manufacturing method of the liquid crystal display device of the present invention. The embodiment 7 corresponds to the combination of the embodiment 4 and the embodiment 3. FIG. 9 shows another constitution of the respective end portions TP formed by cutting away a portion of the sealing member SL where the liquid crystal filling port ECL is formed in adopting the manufacturing method explained in conjunction with the embodiment 4. FIG. 9 corresponds to FIG. 7.

The constitution which makes the embodiment shown in FIG. 9 different from the embodiment shown in FIG. 7 lies in that the end portions TP formed by cutting away a portion of the sealing member SL where a liquid crystal filling port ECL is constituted are respectively connected to material layers ML made of a material different from a material of the sealing member SL. The material layer ML can be formed of the same material as columnar spacers arranged within an image display part AR, and the material layers ML can be formed simultaneously with the columnar spacers, for example.

As viewed in a plan view, the respective material layers ML are formed in a pattern where a wedge-shaped recessed portion is formed on faces PF of the material layers ML which face the liquid crystal filling port ECL in an opposed manner. Further, a bottom portion of the recessed portion of the material layer ML is substantially aligned with a center line (for example, corresponding to a chained line P in the drawing) along the longitudinal direction of the sealing member SL. Due to such a constitution, when the pair of plural-piece simultaneous manufacturing substrates LSUB1, LSUB2 is cut along the chained line P in the drawing, a shape of the sealing members SL and a shape of the material layers ML (shape of the liquid crystal filling port ECL) of the respective liquid crystal cells which are arranged adjacent to each other with the chained line P sandwiched therebetween as a boundary can be formed into a shape shown in FIG. 5A. Accordingly, this embodiment can acquire an advantageous effect that the liquid crystal filling port ECL can be reliably sealed by the sealing agent CLG.

The other explanations are substantially equal to the explanations made in conjunction with the embodiment 3 and hence, the description of the embodiment 3 is directly used as it is and their repeated explanation is omitted.

Although the present invention has been explained heretofore in conjunction with the embodiments, the constitutions of the respective embodiments explained heretofore merely show one example of the present invention, and various modifications of the present invention are conceivable without departing from the technical concept of the present invention.

Further, the constitutions of the respective embodiments may be used in combination so long as these embodiments contradict each other.

What is claimed is:

1. A liquid crystal display device comprising:
a rectangular first substrate and a rectangular second substrate which are arranged to face each other in an opposed manner with liquid crystal sandwiched therebetween;
an image display part having a plurality of pixels; and
a sealing member which is formed between the first substrate and the second substrate while surrounding the image display part and seals the liquid crystal therein, wherein
the sealing member includes a liquid crystal filling port which is formed by cutting away a portion of the sealing member,
a side-wall edge surface of the first substrate and a side-wall edge surface of the second substrate are made coplanar with a side-wall edge surface of the sealing member along the extending direction of the sealing member on at least one side of the first substrate and the second substrate where the liquid crystal filling port is formed,
the liquid crystal filling port is formed such that a width of the liquid crystal filling port is gradually narrowed along the liquid-crystal filling direction, and
respective end portions formed by cutting away the sealing member in a portion of the sealing member where the liquid crystal filling port is formed are formed such that, as viewed in a plan view, faces of the end portions which face the liquid crystal filling port in an opposed manner have an angle inclined toward a center side of the liquid crystal filling port along the liquid-crystal filling direction.

2. A liquid crystal display device according to claim 1, wherein the respective end portions formed by cutting away the sealing member in a portion of the sealing member where the liquid crystal filling port is formed are formed such that, as viewed in a plan view, spotted sealing members which are formed on a more image-display-part side than a center line along the longitudinal direction of the sealing member and on a more liquid-crystal-filling-port side than the end portion are connected to the end portions.

3. A liquid crystal display device according to claim 1, wherein the respective end portions formed by cutting away the sealing member in a portion of the sealing member where the liquid crystal filling port is formed are formed such that faces of the end portions which face the liquid crystal filling port in an opposed manner are connected to material layers made of a material different from a material of the sealing member and, as viewed in a plan view, faces of the material layers which face the liquid crystal filling port in an opposed manner have an angle inclined toward a center side of the liquid crystal filling port along the liquid-crystal filling direction.

4. A liquid crystal display device according to claim 3, wherein columnar spacers are formed between the first substrate and the second substrate in the image display part, and the material layers are made of the same material as the columnar spacers.

* * * * *